US010994872B2

(12) United States Patent
Mattern et al.

(10) Patent No.: US 10,994,872 B2
(45) Date of Patent: May 4, 2021

(54) ORDER-PICKING CELL

(71) Applicant: Liebherr-Verzahntechnik GmbH, Kempten (DE)

(72) Inventors: Thomas Mattern, Rieden (DE); David Hänschke, Altusried (DE); Michael Kluge, Kempten (DE); Regina Simon, Kempten (DE)

(73) Assignee: LIEBHERR-VERZAHNTECHNIK GMBH, Kempten (DE)

( * ) Notice: Subject to any disclaimer, the term of this patent is extended or adjusted under 35 U.S.C. 154(b) by 114 days.

(21) Appl. No.: 16/303,091

(22) PCT Filed: May 17, 2016

(86) PCT No.: PCT/EP2016/000819
§ 371 (c)(1),
(2) Date: Nov. 19, 2018

(87) PCT Pub. No.: WO2017/198281
PCT Pub. Date: Nov. 23, 2017

(65) Prior Publication Data
US 2019/0185267 A1 Jun. 20, 2019

(51) Int. Cl.
*B65B 5/10* (2006.01)
*B65B 5/12* (2006.01)
(Continued)

(52) U.S. Cl.
CPC ............... *B65B 5/10* (2013.01); *B07C 3/008* (2013.01); *B07C 3/087* (2013.01); *B07C 5/34* (2013.01);
(Continued)

(58) Field of Classification Search
CPC ................. B65G 2203/0233; B65B 5/10
See application file for complete search history.

(56) References Cited

U.S. PATENT DOCUMENTS 5,664,404 A * 9/1997 Ivanov ................ B65B 19/34
53/430
6,061,607 A * 5/2000 Bradley ............... B65G 1/1376
414/273
(Continued)

FOREIGN PATENT DOCUMENTS

DE       10019632 A1    10/2001
DE     102008046325 A1   3/2010
(Continued)

OTHER PUBLICATIONS

ISA European Patent Office, International Search Report Issued in Application No. PCT/EP2016/000818, dated Feb. 14, 2017, WIPO, 4 pages.
(Continued)

*Primary Examiner* — Thomas Randazzo
(74) *Attorney, Agent, or Firm* — McCoy Russell LLP

(57) ABSTRACT

The present invention relates to a picking cell for a job-related automated picking of goods that can remove different goods from supply bins and can transfer them into an output bin in an automated manner, said picking cell comprising: an object detection device for detecting the goods in a supply bin; a gripper for removing the goods from a supply bin; and a cell control for evaluating the data of the object detection device and for a path planning and a control of the gripper, wherein the cell control controls the gripper such that different goods of a job or of a partial job are placed at a predefined position and/or with a predefined orientation in the output bin.

15 Claims, 5 Drawing Sheets

(51) Int. Cl.
  *B65G 1/137*     (2006.01)
  *B25J 9/16*      (2006.01)
  *B25J 9/00*      (2006.01)
  *G06Q 10/08*     (2012.01)
  *B07C 5/34*      (2006.01)
  *B07C 3/00*      (2006.01)
  *B07C 3/08*      (2006.01)
  *B65G 47/90*     (2006.01)

(52) U.S. Cl.
  CPC .......... *B25J 9/0093* (2013.01); *B25J 9/1679* (2013.01); *B65B 5/105* (2013.01); *B65B 5/12* (2013.01); *B65G 1/1373* (2013.01); *B65G 1/1378* (2013.01); *G06Q 10/087* (2013.01); *B07C 2501/00* (2013.01); *B65G 47/90* (2013.01); *B65G 2203/0233* (2013.01); *B65G 2203/041* (2013.01)

(56) References Cited

U.S. PATENT DOCUMENTS

| | | | | |
|---|---|---|---|---|
| 7,246,706 | B1* | 7/2007 | Shakes | B07C 7/02 209/614 |
| 8,326,679 | B1* | 12/2012 | Rowe | G06Q 10/08 705/7.38 |
| 9,390,748 | B1* | 7/2016 | Kritchevsky | G11B 17/225 |
| 9,958,851 | B2 | 5/2018 | Mattern et al. | |
| 10,026,044 | B1* | 7/2018 | Wurman | G06Q 10/047 |
| 2006/0206235 | A1* | 9/2006 | Shakes | B65G 1/1373 700/216 |
| 2011/0170998 | A1 | 7/2011 | Winkler | |
| 2013/0110280 | A1* | 5/2013 | Folk | B25J 9/1697 700/215 |
| 2013/0158710 | A1* | 6/2013 | Oda | B25J 9/1669 700/259 |
| 2014/0017048 | A1* | 1/2014 | Mattern | G06T 1/0014 414/567 |
| 2014/0121836 | A1* | 5/2014 | Ban | B25J 9/0093 700/259 |
| 2014/0157732 | A1* | 6/2014 | Gasber | B65B 5/12 53/473 |
| 2014/0234066 | A1 | 8/2014 | Mathi et al. | |
| 2014/0244026 | A1* | 8/2014 | Neiser | B65G 1/1378 700/216 |
| 2015/0032252 | A1* | 1/2015 | Galluzzo | B25J 9/162 700/218 |
| 2016/0244262 | A1* | 8/2016 | O'Brien | G06Q 10/087 |
| 2017/0043953 | A1* | 2/2017 | Battles | G06Q 10/087 |
| 2017/0136632 | A1* | 5/2017 | Wagner | B25J 9/1697 |
| 2017/0169672 | A1* | 6/2017 | Farrow | G08B 5/36 |
| 2017/0232476 | A1* | 8/2017 | Hanson | B07C 3/008 700/223 |
| 2020/0180874 | A1* | 6/2020 | Mattern | B25J 15/00 |

FOREIGN PATENT DOCUMENTS

| | | |
|---|---|---|
| DE | 102009023808 A1 | 12/2010 |
| DE | 102010002317 A1 | 8/2011 |
| DE | 102014008108 A1 | 12/2015 |
| EP | 2650237 A1 | 10/2013 |
| WO | 2014166650 A1 | 10/2014 |
| WO | 2015118171 A1 | 8/2015 |

OTHER PUBLICATIONS

ISA European Patent Office, International Search Report Issued in Application No. PCT/EP2016/000819, dated Feb. 14, 2017, WIPO, 10 pages.

* cited by examiner

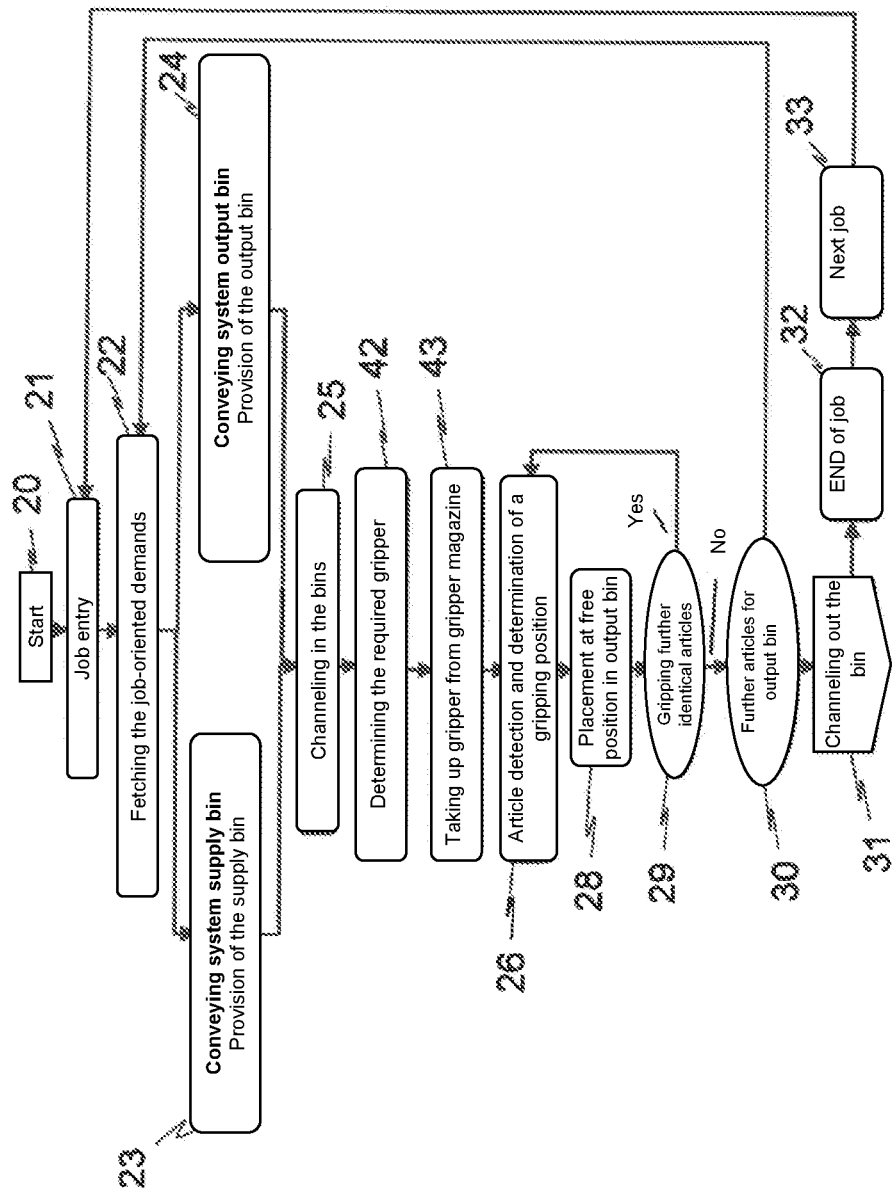

ORDER-PICKING CELL

CROSS-REFERENCE TO RELATED APPLICATION

The present application is a U.S. National Phase of International Patent Application Serial No. PCT/EP2016/000819, entitled "ORDER-PICKING CELL," filed on May 17, 2016. The entire contents of the abovementioned application is hereby incorporated by reference in its entirety for all purposes.

TECHNICAL FIELD

The present invention relates to a picking cell for a job-related automated picking of goods. The picking cell can remove different goods from supply bins in an automated manner and can transfer them into an output bin to work through a job and/or a partial job.

BACKGROUND AND SUMMARY

Such a picking cell is known from DE 10 2008 046 325 A1. The system shown there for a fully automated picking has a first conveyor device with which the articles to be picked are conveyed to the picking cell in the form of an article stream. The conveying can take place in bins. An object recognition unit is provided in the region of the picking cell to recognize the location and the orientation of the articles on the first conveyor device. The picking cell furthermore has a gripping unit that is supported at the ceiling and that can be raised and lowered to grip any desired article from the bins. In the preferred embodiment of DE 10 2008 046 325 A1, the articles are moved by the gripping unit onto a second conveyor device by which they are transported to output bins. In a possible alternative embodiment, the articles can also be dispensed directly into the output bins by the gripping unit in that the articles are dropped by the gripping unit above a corresponding bin. The picking cell known from DE 10 2008 046 325 A1 can, however, not work with any desired goods and does not ideally fill the output bins.

An apparatus for an automated removal of workpieces arranged in a bin is known from DE 10 2014 008 108 A1. It has a supply module, a handling module, and an output module. However, the apparatus does not serve the picking of goods.

It is the object of the present invention to provide a picking cell that enables a better loading of the output bins and/or the picking of a greater variety of goods.

In a first aspect, the present invention comprises a picking cell for a job-related automated picking of goods, wherein the picking cell can remove different goods from supply bins and can transfer them into an output bin in an automated manner to work through a job and/or a partial job. The picking cell comprises an object detection device for detecting the goods in a supply bin and a gripper for removing the goods from the supply bin. A cell control is furthermore provided for evaluating the data of the object detection device and for a path planning and a control of the gripper. In accordance with the invention, the picking cell in accordance with the first aspect is characterized in that the cell control controls the gripper such that different goods of a job or of a partial job are placed into the output bin at a predefined position and/or with a predefined orientation.

In accordance with the invention, the goods are thus no longer moved into the output bin in that they are dropped above the output bin. The goods are rather placed in the output bin at a predefined position and/or with a predefined orientation. This makes it possible to use the space present in the output bin substantially more effectively. The method in accordance with the invention can furthermore be carried out with any desired goods and not only with those that survive a drop from a certain height without any damage.

In accordance with the invention, the goods can also be placed in the output bin in each case at a predefined position and/or with a predefined orientation when a job or partial job comprises a plurality of different goods.

The cell control preferably controls the gripper such that different goods of a job or partial job are placed in the output bin next to one another and/or on top of one another. The embodiment of the cell control preferably enables both a placement of the goods next to one another and on top of one another in the output bin to thus enable an ideal filling of the output bin.

The cell control and/or a job management control preferably determines the position and/or orientation of all the goods of a job or partial job that are to be picked together in one output bin before the start of and/or during the picking. If the position and/or orientation of all the goods is/are determined before the start of the picking, the arrangement of the goods can be optimized. It is in contrast possible to react flexibly to unforeseen events and/or changes by a determination of the position and/or orientation of at least some of the goods during the picking.

In a preferred embodiment of the present invention, the cell control and/or a job management control for working through a job and/or a partial job fetches predetermined goods properties of the goods to be picked by a job or receives them in a different manner and determines the position and/or orientation of all the goods of a job and/or of a partial job that are to be picked together in one output bin on the basis of the goods properties.

Alternatively or additionally, the cell control and/or the job management control can determine the order in which the goods of a job are to be placed into an output bin. The cell control or the job management control can be in communication with a database that comprises goods properties of all the goods that can be picked by the system. The corresponding goods properties can be fetched from this database system after receipt of a job and/or partial job and can be evaluated by the cell control or job management control.

The position and/or orientation and/or the order of the picking of the goods of a job and/or partial job is/are preferably determined such that heavy goods are placed down at the bottom and/or first in a bin.

In a possible embodiment, the cell control and/or a job management control for working through a job can fetch and/or receive predetermined goods properties of the goods to be picked by a job and can split the job into a plurality of partial jobs in the framework of which a respective output bin is filled with goods on the basis of the goods properties. If all the goods that should be picked by a job can therefore not be placed in an output bin, the job is divided into a plurality of partial jobs.

The splitting into partial jobs preferably takes place together with the determination of the position and/or orientation of the goods in the respective output bins. It is preferably ensured on the splitting of a job into partial jobs that the goods to be picked by a partial job can be placed in the output bin provided for this purpose.

Alternatively or additionally, a suitable bin for a job and/or partial job can be determined from a plurality of output bins on the basis of the goods properties. The output bins can in particular differ with respect to their sizes.

The determination and/or splitting preferably take place on the basis of the weight and/or of the size and/or of the shape and/or of the packing properties and/or of the kind of goods. The above-named goods properties therefore in particular comprise the weight and/or the size and/or the shape and/or the packing properties and/or the kind of respective goods.

The output bins preferably do not have any elements determining the position and/or the orientation of the goods. Output bins are in particular preferably used that can be loaded with any desired goods or into which a plurality of different goods can be placed in different positions and compositions.

The position and/or the orientation of the goods in the output bin is/are preferably determined again by the cell control and/or by a job management control for each job and/or partial job within the framework of the present invention in dependence on the goods contained in the job. The position and/or orientation of the goods can hereby be respectively individually coordinated with the goods properties of the goods to be picked in a job and/or partial job. The position and/or the orientation of the goods can be determined using a geometrical model of the goods and/or of the output bin or bins.

In a possible embodiment, no object detection device is provided for detecting the goods in the output bins. The placement of the goods in the output bins in this case takes place on the basis of already known geometrical data of the goods and/or of the output bin.

In an alternative embodiment, the picking cell comprises a second object detection device for detecting the goods in the output bin. The cell control and/or a job management control preferably checks with reference to the data of the object detection device whether the goods were placed in the predefined position and/or orientation in the output bin. The second object detection device therefore serves the checking of the correct placement of the goods in the output bin.

In a possible embodiment of the present invention, the cell control and/or the job management control can carry out a correction of the position and/or orientation of the goods by the gripper on recognition of incorrectly placed goods. In this case, the good is again gripped from the output bin and is placed again.

In a possible embodiment of the present invention, the cell control and/or the job management control can adapt the position and/or orientation of the following goods of a job to the position and/or orientation of one more goods already placed in the output bin. The position and/or orientation of the further goods to be placed in the output bin as part of the same job and/or partial job is/are preferably adapted to a position and/or to an orientation detected by the second object detection device.

In a further possible embodiment, the position and/or orientation of the good or goods thereupon to be placed into the output bin can be determined for the first time and/or again after each placement process of a good into an output bin. It is ensured by such an embodiment that the position and/or orientation of a following good are always adapted to the actual conditions in an output bin.

In a second aspect of the present invention, it comprises a picking cell for the job-related automated picking of goods, wherein the picking cell can remove different goods in an automated manner from supply bins and can transfer them into an output bin to work through a job and/or partial job. The picking cell comprises an object detection device for detecting the goods in a supply bin and a gripper for removing the goods from a supply bin. A cell control is furthermore provided for evaluating the data of the object detection device and for a path planning and a control of the gripper. The picking cell in accordance with the second aspect is characterized in that it comprises a plurality of different grippers that can alternatively be used for gripping goods.

The use of a plurality of different grippers allows a larger variety of goods to be handled with the picking cell. The picking cell can in particular comprise at least one mechanical and at least one pneumatic gripper and/or a plurality of mechanical grippers having different designs.

In a preferred embodiment of the second aspect, the picking cell has a gripping arm for moving at least one gripper, wherein a plurality of grippers are arranged and/or arrangeable at the gripping arm. Only one gripping arm having corresponding kinematics is hereby required to nevertheless be able to pick goods using one of a plurality of different grippers.

In a possible embodiment, a plurality of different grippers can be simultaneously arranged at the gripping arm.

The picking cell, however, preferably has a gripper magazine having a plurality of different grippers that are selectively arrangeable at the gripper arm, with an automated exchange of the gripper arranged at the gripper arm preferably taking place.

In a possible embodiment of the present invention, the cell control and/or a job management control can determine the gripper or grippers that should be used to grip the goods of a job or of a partial job before the start of and/or during the picking.

In a possible embodiment, the cell control and/or a job management control for working through a job and/or a partial job can fetch predefined goods properties of the goods to be picked by a job and/or partial job and/or can obtain them in a different manner and can determine the gripper or grippers that are to be used for gripping the goods on the basis of the goods properties. The determination preferably takes place by comparison of the goods properties with predefined handling properties of the grippers present. Handling properties can in particular be stored for the grippers present that define which goods can be gripped by the respective gripper. These handling properties are then compared with the goods properties of the goods to be gripped to determine the respective gripper suitable for gripping.

The cell control and/or a job management control for working through a job can furthermore fetch and/or receive predefined goods properties of the goods to be picked by a job and can determine the position and/or orientation of all the goods of a job that should be picked together in an output bin and/or the order in which the goods of a job and/or of a partial job should be placed in an output bin on the basis of the goods properties. Alternatively or additionally, the cell control and/or the job management control can split the job into a plurality of partial jobs as part of which a respective output bin is filled with goods on the basis of the goods properties.

The available grippers are preferably taken into account in the determination of the position and/or orientation and/or the order of the goods and/or a split into partial jobs. Alternatively or additionally, the number of gripper changes required for working through a job and/or partial job can be taken into account. The order in which the goods of a job and/or of a partial job are placed in an output bin and/or the splitting into partial jobs is in particular determined such that as few gripper changes as possible have to be carried out. Cycle time can hereby be saved.

Alternatively or additionally, the determination of the gripper or grippers can take place on the basis of the weight and/or of the size and/or of the shape and/or of the packaging properties and/or the kind of goods. The above-named goods properties are thus in particular the weight and/or the size and/or the shape and/or the packaging properties and/or the kind of goods.

The present invention in a third aspect comprises a picking cell for the job-related automated picking of goods, wherein the picking cell can remove different goods from supply bins and can transfer them in an output bin in an automated manner. The picking cell comprises an object detection device for detecting the goods in a supply bin and a gripper for removing the goods from a supply bin. The picking cell further comprises a cell control for evaluating the data of the object detection device and for the path planning and control of the gripper. The picking cell in accordance with the third aspect is characterized in that it has a buffer station for a temporary placement of a good for a repeat gripping from the buffer station and/or has a buffer store for separating out goods and/or for buffering an output bin. These three variants can each be implemented individually per se or in any desired combination.

The buffer station allows an imprecisely gripped good to be gripped again and thus enables a more exact placement. The buffer allows either a separating out of goods, for example when it is determined by an object detection device that they are defective and/or that it is not the intended good. Alternatively or additionally, the buffer can permit the buffering of an output bin so that a rush job can be brought forward without removing the not yet completely picked output bin from the picking cell.

In a preferred embodiment, the cell control and/or a job management control transfers an output bin into the buffer when the job or partial job associated with the output bin cannot instantaneously be concluded and/or when a job or partial job having a higher priority is to be brought forward. The cell control and/or the job management control works/work through a new job or partial job in the picking cell by filling a further output bin after the transfer of a first output bin into the buffer and restarts the working through of the first job after working through the new job or partial job.

Alternatively or additionally, a separation bin can be transferred into the buffer, with the cell control and/or the job management control checking the goods and separating out defective and/or incorrectly placed goods into the separation bin.

The three aspects of the present invention described in more detail above can each be implemented independently of one another. In the possible embodiment of the present invention, however, any desired two of the three aspects can also be combined with one another or all three aspects can be implemented in one picking system.

Preferred embodiments of the present invention that can be used in each of the three aspects in accordance with the invention are shown in more detail in the following:

The picking cell preferably has a robot arm at which the gripper is arranged. The gripper can be moved by the movement axes of the robot arm. The picking cell preferably in particular has a 6-axis robot at which the gripper is arranged. Such 6-axis robots are used in a variety of manners in assembly plant and/or production plant and are therefore inexpensive in comparison with a special production due to the high volumes.

In a possible embodiment, a picking cell can have two 6-axis robots each having a gripper so that the two grippers can be used in parallel for picking a job.

Alternatively or additionally, the picking cell has an area gantry at which the gripper is arranged. Such an area gantry has at least two, and preferably three, linear movement axes. The gripper is preferably arranged via a gripper arm at the area gantry. The gripper arm preferably has one or more additional movement axes, in particular one or more rotary axes. An area gantry enables a more compact construction size.

In a possible embodiment, a picking cell can have two area gantries each having a gripper that can be used in parallel for picking a job.

A picking cell in accordance with the invention preferably comprises a first conveying system for the supply and/or discharge of the supply bins to/from the picking cell and/or can interact with such a conveying system. The first conveying system can be part of a larger conveying system with which supply bins can be transported from a storage station to the picking cell and back. Alternatively or additionally, the picking cell can have a conveying system that cooperates with a larger conveying system.

The picking cell can furthermore comprise a second conveying system for supplying or discharging the output bins to/from the picking cell and/or can cooperate with such a conveying system. The second conveying system can here also be part of a larger conveyor system or can cooperate therewith. The second conveying system can, for example, convey the output bins onward to a shipment line.

The picking cell in accordance with the invention can have one or more supply bin positions. The supply bin positions are preferably arranged such that the gripper can remove goods from supply bins that are arranged in the supply bin positions. The supply bin positions can in particular be one or more bin receptacles for receiving supply bins. The supply bin positions can also be positions at which the supply bin or bins are transported through the first transport system for example by a transport belt on which the bins are moved into a corresponding supply bin position within the picking cell in which goods can be removed by the gripper.

The picking cell can furthermore have one or more output bin positions. Goods can preferably be placed by the gripper in an output bin that is located in an output bin position. The output bin positions can be one or more bin receptacles for receiving output bins. The output bin position can furthermore be formed by a transport line that moves an output bin into an output bin position of the picking cell in which goods can be placed into the output bin.

If the picking cell has a plurality of output bin positions, in particular in the form of bin receptacles for the reception of supply bins and/or of output bin positions, in particular in the form of bin receptacles for receiving output bins, the cycle times in the processing can be reduced so a second supply bin having further goods can be provided while goods are removed from the first supply bin and/or an empty output bin can be provided while a first output bin is just being loaded.

The picking cell can respectively have a line for channeling in and/or for channeling out via which bins can be transported from and/or to a conveying system and/or from a bin receptacle. The lines for channeling in and/or out can, however also be integrated in the conveying systems.

A picking cell in accordance with the invention can have a transfer line that allows a transfer of a supply bin to an output bin position so that the supply bin can be used as the output bin. The cell control and/or a job management control can in particular be configured such that the supply bin is used as an output bin after the transfer. The corresponding supply bin can, for example be used as the output bin via the transfer line in those cases in which all the goods that are located in a supply bin are to be picked for a job or partial job. Reloading the goods individually from the supply bin in a separate output bin can hereby in particular be dispensed with.

The picking cell in accordance with the invention allows the picking of a plurality of different goods. Different goods, i.e. goods having different goods properties, can in particular be placed in an output bin within a job and/or partial job.

The goods can be supplied to the supply bin in homogeneous form in a possible embodiment so that a plurality of supply bins are supplied to the picking cell consecutively or simultaneously for working through a job or partial job that comprises a plurality of different goods.

Alternatively or additionally, it is conceivable to provide a plurality of different goods in a supply bin. In jobs that only comprise those goods that are stored together in such a bin the supply of only one supply bin to the picking cell is therefore sufficient to work through the job and/or partial job.

In a possible embodiment, the goods can be arranged in a non-ordered manner in at least some of the supply bins. A secure gripping of the goods from the supply bins is nevertheless ensured by the first object detection device. The goods can, however, naturally also be arranged in an ordered or part-ordered form in at least some of the supply bins.

A 2D camera or a 3D camera and/or a laser scanner can be used as the object detection device in accordance with the invention. The object detection device preferably permits the detection of the position and/or orientation of the goods present in a supply bin and/or in an output bin. The object detection device is furthermore preferably configured such that a reliable identification of the respective goods is possible with reference to the detected data. For this purpose, for example, the detected shapes, barcodes, logos and/or surface properties of the detected goods can be evaluated and can be used to identify the goods. The detected data can be compared with stored goods properties for this purpose.

The cell control preferably plans a movement path for the gripper and/or for the gripper arm at which the gripper is arranged on the basis of the data of the object detection device to grip a good from a supply bin and to place it at the desired position in the output bin.

A picking cell used within the framework of the present invention can in particular be set up or work in a manner such as the apparatus known from DE 10 2014 008 108 A1 for an automated removal of workpieces arranged in a bin. The picking cell can comprise a handling module described there and/or can comprise a supply module, a handling module, and an output module.

The present invention further comprises a picking system having one or more picking cells such as have been described above in more detail.

The picking system preferably comprises a first conveying system for supplying and/or discharging the supply bins to and/or from the picking cell or cells and a second conveying system for supplying and/or discharging the output bins from and/or to the picking cell or cells. The first conveying system preferably connects the picking cell or the picking cells to a storage system. The second conveying system can connect the picking cell or the picking cells to a shipment line.

The picking system preferably has a job management control for working through a plurality of picking jobs by controlling the first and second conveying systems and the picking cell or picking cells.

The present invention further comprises a job management control and/or a cell control for controlling a picking cell and/or a picking system such as has been described above.

The present invention further comprises software for a job management control and/or a cell control in accordance with the present invention. The software can in particular implement a job management control and/or a cell control such as has been described above when it runs on a computer.

The cell control can be associated with the respective picking cell. The cell control can, however, optionally also be integrated in a higher ranking job management control.

Conversely, a picking cell in accordance with the invention can comprise a job management control. Alternatively, the job management control can represent a higher ranking component that communicates with a picking cell in accordance with the invention and/or a cell control in accordance with the invention.

The job management control and/or cell control preferably comprises at least one processor and at least one memory in which software for implementing the above-named functions of the job management control and/or cell control is stored and that carries out the above-named functions on execution by the processor. The job management control and/or cell control can comprise a database having goods properties and/or handling properties or can communicate with such a database.

The present invention further comprises a method for the job-related automated picking of goods in which different goods are removed from supply bins and are transferred into an output bin in an automated manner for working through a job and/or partial job. The method in accordance with the invention takes place using a picking cell and/or a picking system such as has been described above.

The method preferably takes place such as has already been shown in more detail above.

The present invention will now be shown in more detail with reference to drawings and to embodiments.

BRIEF DESCRIPTION OF THE FIGURES

FIG. 6 shows a flowchart of a fourth embodiment of a method in accordance with the invention.

DETAILED DESCRIPTION

The present invention comprises a picking cell and a picking method for picking goods, wherein the goods can be in particular be articles of daily use and/or industrial goods. The picking cell typically represents an element of a material flow system. The material flow system can further comprise a storage system, a shipment line and/or conveying systems for conveying the goods between the individual components of the material flow system.

The material flow system and/or the picking cell is designed for the handling of goods of different size, different shape and/or configuration and/or is designed with a different packaging and therefore permits an individual handling of the goods.

Figure 1:
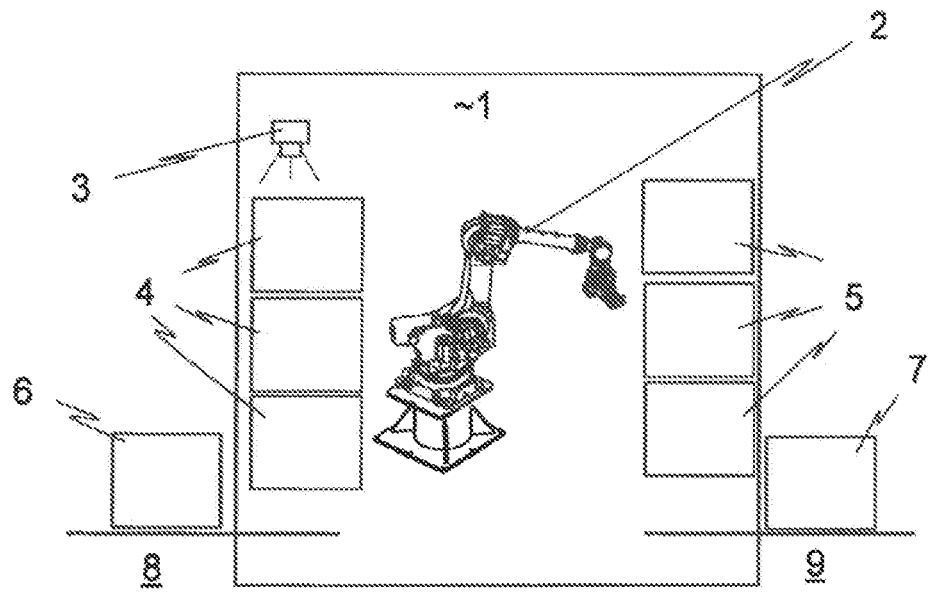
FIG. 1 shows a first embodiment of a picking cell in accordance with the invention.

The first embodiment of a picking cell 1 shown in FIG. 1 comprises a picking robot 2 having a gripper arranged at a gripper arm. In the embodiment, the gripper arm is the robot arm of a 6-axis robot. Alternatively, the gripper arm can be arranged at an area gantry. The picking cell further comprises a first bin reception station 4 for receiving supply bins 6 that are supplied and/or discharged via a first conveying system 8. The first conveying system can in particular be a channeling in passage. The picking cell further comprises a second bin reception station 5 for receiving output bins 7 that are supplied and/or discharged via a second conveying system 9. The second conveying system 9 can in particular be a channeling out passage. An object detection device 3 is further provided that at least detects the position and/or orientation of the goods located in a supply bin.

Figure 2:
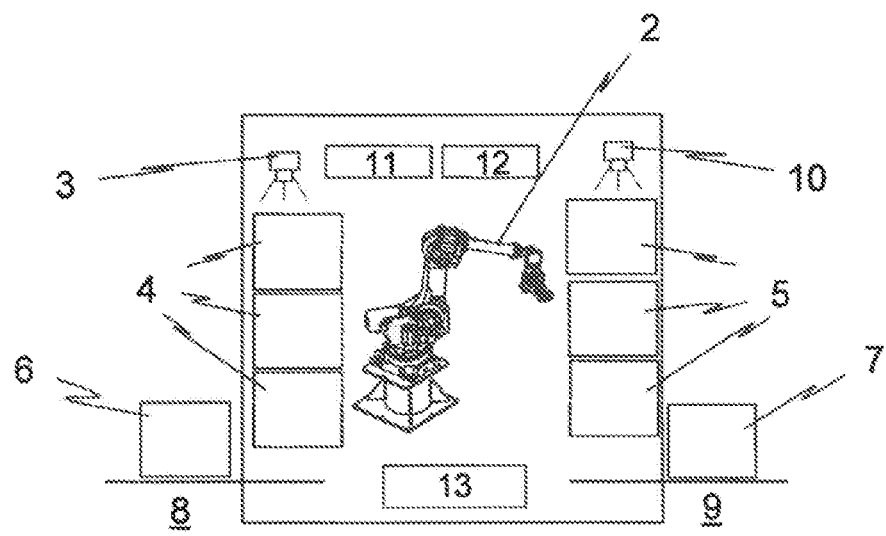
FIG. 2 shows a second embodiment of a picking cell in accordance with the invention.

The embodiment shown in FIG. 2 first comprises the components already described with respect to FIG. 1. The embodiment further comprise a buffer tray 11, a gripper magazine 12, and a buffer 13, as well as a second object detection device 10 that at least detects the position and/or orientation of the goods located in an output bin.

The first bin reception station provides the picking robot with the supply bins 6 filled with goods so that the gripper of the picking robot 2 can remove goods from the supply bins. The second bin reception station 5 provides the gripper with the output bins so that the picking robot can place the goods received from the supply bins in the output bins.

In the embodiment shown in FIG. 1, the first bin reception station and the second bin reception station each have a plurality of bin receptacles so that a respective plurality of supply bins and/or a plurality of output bins are accessible to the robot. In alternative embodiments, the reception stations can also only have one reception position for only one bin. The reception stations can additionally be part of the respective conveying system.

The first conveying system 8 is used for channeling supply bins 6 into the picking cell and thus for providing the goods located in the supply bins for transfer by means of the picking robot 2. The first bin reception station 4 in which the supply bins are provided to the picking robot is preferably designed such that a plurality of supply bins 6 can be arranged in the access region of the picking robot, for example next to one another or after one another. After removal of the desired number of articles from a supply bin, they are again discharged by means of the first conveying system 8 so that a job-oriented picking can take place in an exactly cycled manner.

The second conveying system 9 provides one or more output bins 7 that are filled with goods by the picking robot 2 and conveys the completely picked bins onward from the picking cell. The second bin reception station 5 provided for this purpose is preferably configured such that a plurality of output bins can in turn be arranged in the access region of the picking robot 2. The second output station 5 is preferably arranged opposite the first bin reception station. The plurality of bin receptacles of the bin reception station can in turn be arranged next to one another or after one another.

An object detection device 3 is provided above the first reception station 4 that at least detects the position and/or orientation of the goods located in a supply bin.

The first object detection device can comprise a chamber unit. The object detection device can in particular comprise a 2D camera and/or a 3D camera. The use of a plurality of camera units, in particular a combination of a 2D camera and a 3D camera, is also conceivable. The object detection unit can further comprise a laser scanner. The use of laser triangulation by a laser scanner arranged above the bin receptacles is in particular conceivable. An exact detection of the goods located in a bin and an exact removal of the objects to be picked is ensured by the ideal illumination of the bins hereby provided.

The object detection unit initially serves the detection of the position and orientation of the goods located in the respective bin. It is preferably configured such that a reliable object detection additionally takes place by which the respective good can be identified. This can take place on the basis of the shape, of a barcode, of a logo or of a surface property.

The picking cell further comprises a cell control, not shown, that communicates with the object detection device 3 and with the picking robot 2 via data transmission lines and determines the position and/or orientation of the detected goods from the data supplied by the object detection device, determines gripping positions and gripping paths, and controls the robot to grip and place goods. The cell control in particular causes the picking robot to pick the goods in a job-oriented manner. This permits an automation of the transfer of the goods from the supply bins 6 to the output bins 7. An operator is therefore no longer needed for the picking.

The cell control or a higher ranking job management control first determines the respective size of the goods picked as part of a job after receipt of the job and determines their position and/or orientation within the output bin.

The object detection device 3 and the cell control are configured such that the goods can be provided in the supply bins in a resorted manner. The picking robot 2 is able to grip and pick goods out of a bin in different gripping levels.

In accordance with the invention, a large number of different articles such as boxes, gummi bear packs, bottles, cans, screws, brackets can preferably be picked by a picking cell, with the picking process being carried out automatically.

Depending on the area of use of a picking cell in accordance with the invention, the picking robot 2 is equipped with at least one gripper to meet the corresponding gripper demands of the use. A suction gripper, a mechanical gripper such as a 2-finger gripper or a 3-finger gripper, etc. can be used as the gripper, for example.

The picking robot 2 has, in accordance with the predefined demands on the use, corresponding handling properties such as size, gripping force, and a corresponding gripper. The picking robot is hereby able to pick all the articles defined as grippable by means of these handling properties. The handling properties are preferably stored in the cell control and/or job management control and can be compared with goods properties to determine whether certain goods can be picked by the picking cell or not.

In the embodiment shown in FIG. 2, the gripper of the picking robot 2 can be changed to meet a larger spectrum of demands on the articles to be gripped. Such a gripper change preferably takes place between two picking processes in an exactly cycled manner and without time loss. A gripper magazine 12 is preferably provided for this purpose in which a plurality of different grippers are provided. The gripper magazine 12 is arranged in the movement range of the picking robot so that an automated gripper change can take place. Such a gripper magazine or such a gripper change station makes it possible to satisfy expanded demands on the goods handling, to adapt the robot to the respective gripping demands, and hereby to be able to pick as many different goods as possible within the same picking cell.

For example, the articles to be picked can be gummi bear packs, cans, bottles, cartons, screws, brackets, etc., which makes it clear that substantial advantages in the handling are associated with such a gripper change.

The picking cell in accordance with the invention permits a placement of goods in an exact position in the output bins. A filling of the output bins is hereby possible that is exactly in line with the job and is precise. In a possible embodiment, the output bins can move directly into shipping.

Such a demand can take place by means of a database in which geometrical data of the goods to be picked are stored and/or geometrical data of the output bins used. An exact filling of the respective output bin is made possible on the basis of these data. The position and/or orientation of the goods that are to be placed in an output bin is/are in particular calculated for working through a job. These data are then forwarded to the control of the picking robot 2 that places the goods in the corresponding position and/or orientation.

In the second embodiment in FIG. 2, a second object detection unit 10 is arranged above the second bin reception station 5. The second object detection unit 10 can be set up and can work such as has already been described above for the first object detection unit. The position and/or orientation of the goods located in an output bin can be detected via the second object detection device 10.

In the embodiment shown in FIG. 2, an object detection of the goods already stored in the output bin is therefore possible. The correct filling of the bins can hereby be monitored. A repeat object recognition can, for example, be carried out on an incorrect filling and on a space problem caused thereby in the output bin by means of the object detection unit 10 and/or a gripping of the good from the output bin and a repeated precise positioning of the good can be carried out. Such an incorrect filling can, for example, be caused by the falling over and/or shifting of a good in the output bin.

The second embodiment in FIG. 2 furthermore has the possibility of conveying a supply bin into an output bin position so that a supply bin can be used directly as the output bin and can optionally be fully picked by the picking robot and can then be channeled out via the second conveying system 9.

The embodiment shown in FIG. 2 further has an intermediate store 11 that, for example, serves as a placement possibility for incorrectly gripped goods. This permits a problem-free gripping.

The embodiment shown in FIG. 2 further has a buffer 13 in which an output bin only partially picked can be buffered. This makes it possible with missing articles not to have to completely abort the picking, but rather to buffer the only partly picked bin and to work through a further picking job in the meantime while the missing good is provided via the first conveying system.

The buffer 13 further enables the working through of rush jobs since the instantaneously processed job can be put back without problem by means of the buffer to immediately work through a rush job. After ending the rush job, the already started job can be taken up again in that the corresponding output bin is transferred from the buffer into the second bin reception station. The cell control or a job management control also takes over the integration of such rush jobs in the job processing.

Alternatively or additionally, it is conceivable to provide a bin in the buffer in which damaged or incorrectly sorted goods are placed.

Different embodiments of picking processes are now shown in FIGS. 3 to 6 that can be carried out using a picking cell in accordance with the invention. The respective processes are carried out in an automated manner by a job management control and/or by a cell control.

Figure 3:
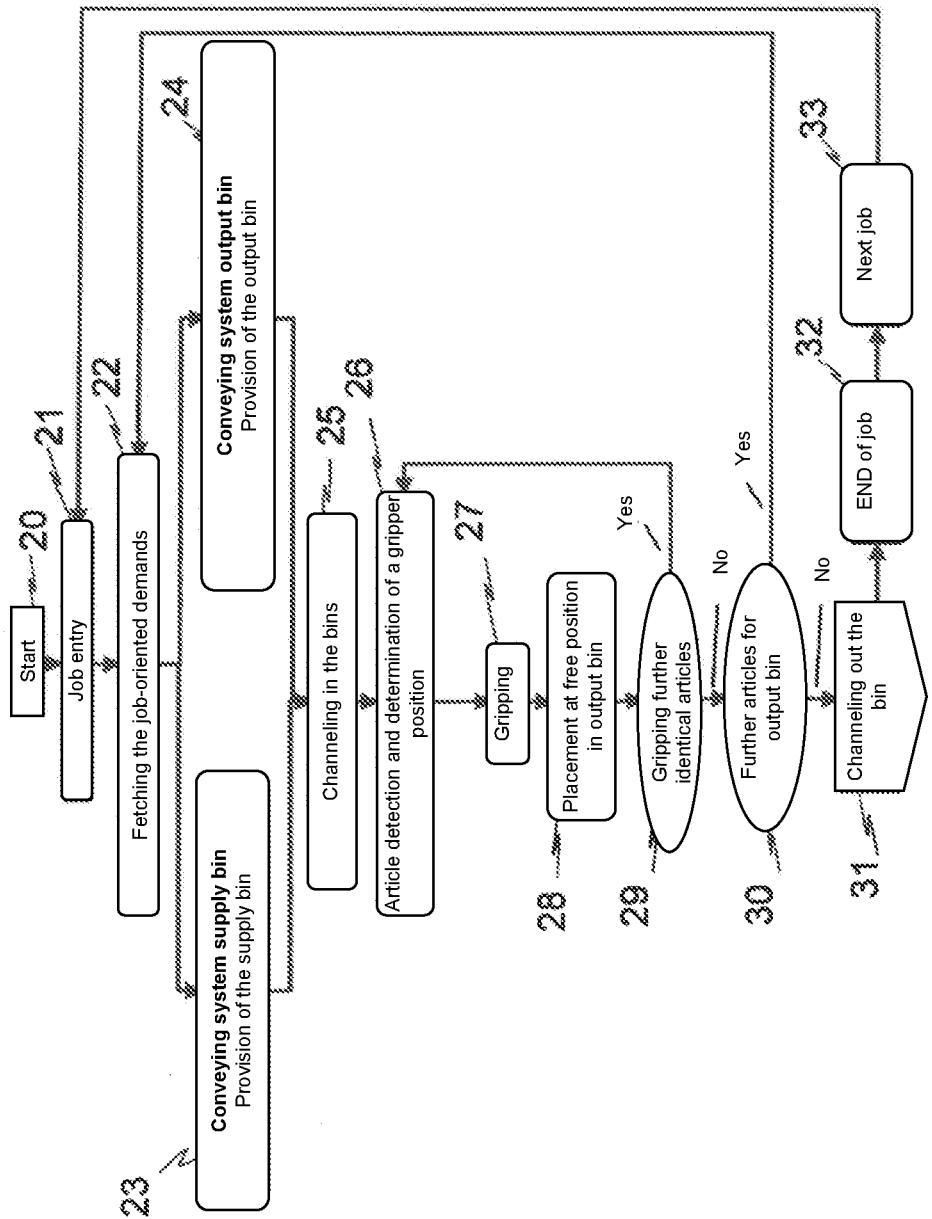
FIG. 3 shows a flowchart of a first embodiment of a method in accordance with the invention.

FIG. 3 shows a flowchart of a basic embodiment of the method in accordance with the invention. After the start of the method in step 20, the control waits for a job entry in step 21. If such a job entry has taken place, the job-oriented demands are fetched in step 22. Goods properties of the goods to be picked as part of the job are in particular fetched.

A control of the first conveying system now take place in step 23 and a control of the second conveying system in step 24 to provide the supply bin or bins required for the working through of the job and to provide one or more output bins required for working through the job. The bins are then channeled into the first or second bin reception stations in step 25. A detection of the goods in the supply bin and the determination of a gripping position take place in step 26 using the object detection unit 3 in accordance with the invention. A control of the gripper for gripping the good takes place in step 27. The gripper is controlled in step 28 such that the good is placed at a free position in the output bin. A check is made in step 29 whether further identical articles are to be picked as part of the same job. If this is the case, the steps 26 to 28 are carried out again to remove a further article from the supply bin and to place it in the output bin.

A check is made in step 30 whether a further article has to be placed in the output bin to complete the job. If this is the case, the method returns to step 22 to provide another, different article by the supply and channeling in of a further supply bin in steps 23 and 25 and to move it from the supply bin into the output bin. On such a repetition, no further output bin has to be provided or channeled in since the output bin is already located in the second bin reception station.

If no further article has to be picked in the output bin, at least the output bin is channeled out in step 31. A channeling out of the supply bin or bins optionally also takes place. An ending of the job hereby takes place in step 32. A new job can now be begun in step 33.

Figure 4:
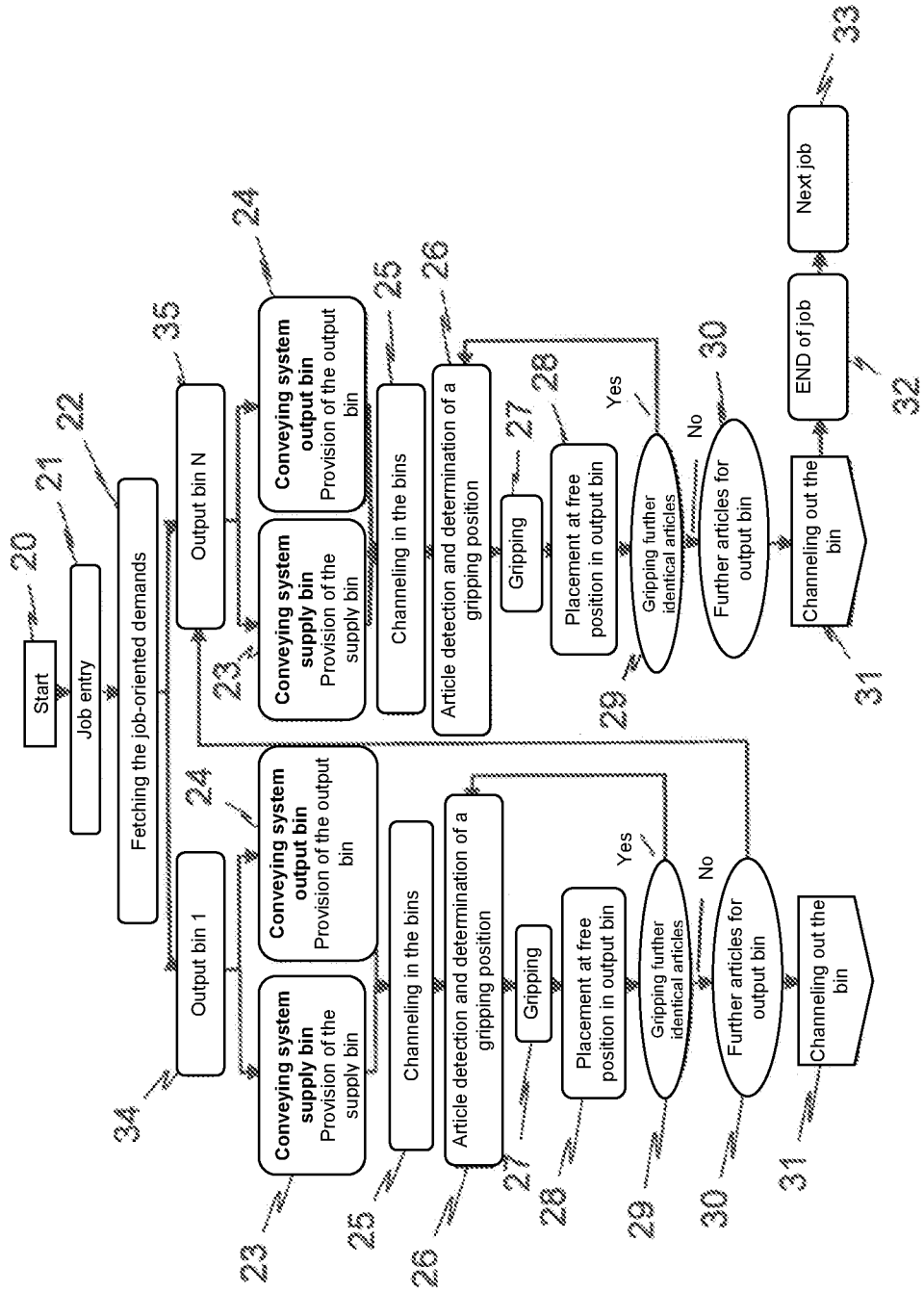
FIG. 4 shows a flowchart of a second embodiment of a method in accordance with the invention.

FIG. 4 shows a variant of the method shown in FIG. 3 in which the picking shown in FIG. 3 can take place for a plurality of output bins 34 and 35. A determination can be made as part of step 22 whether a plurality of output bins have to be filled to work through a job. In this case, the job is split into corresponding partial jobs within which the plurality of output bins 34 and 35 are filled.

The working through of the partial jobs can take place either in parallel in that the method in accordance with the invention is carried out in parallel for at least two output bins after the fetching of the job-orientated demand in step 22. This is in particular possible when a plurality of bins that can be filled in parallel can be received in the first and second bin reception stations. Alternatively, two picking cells working in parallel can also be used.

Alternatively or additionally, the plurality of output bin 34 and 35 can also be picked after one another and the partial jobs can thus be worked through after one another.

Figure 5:
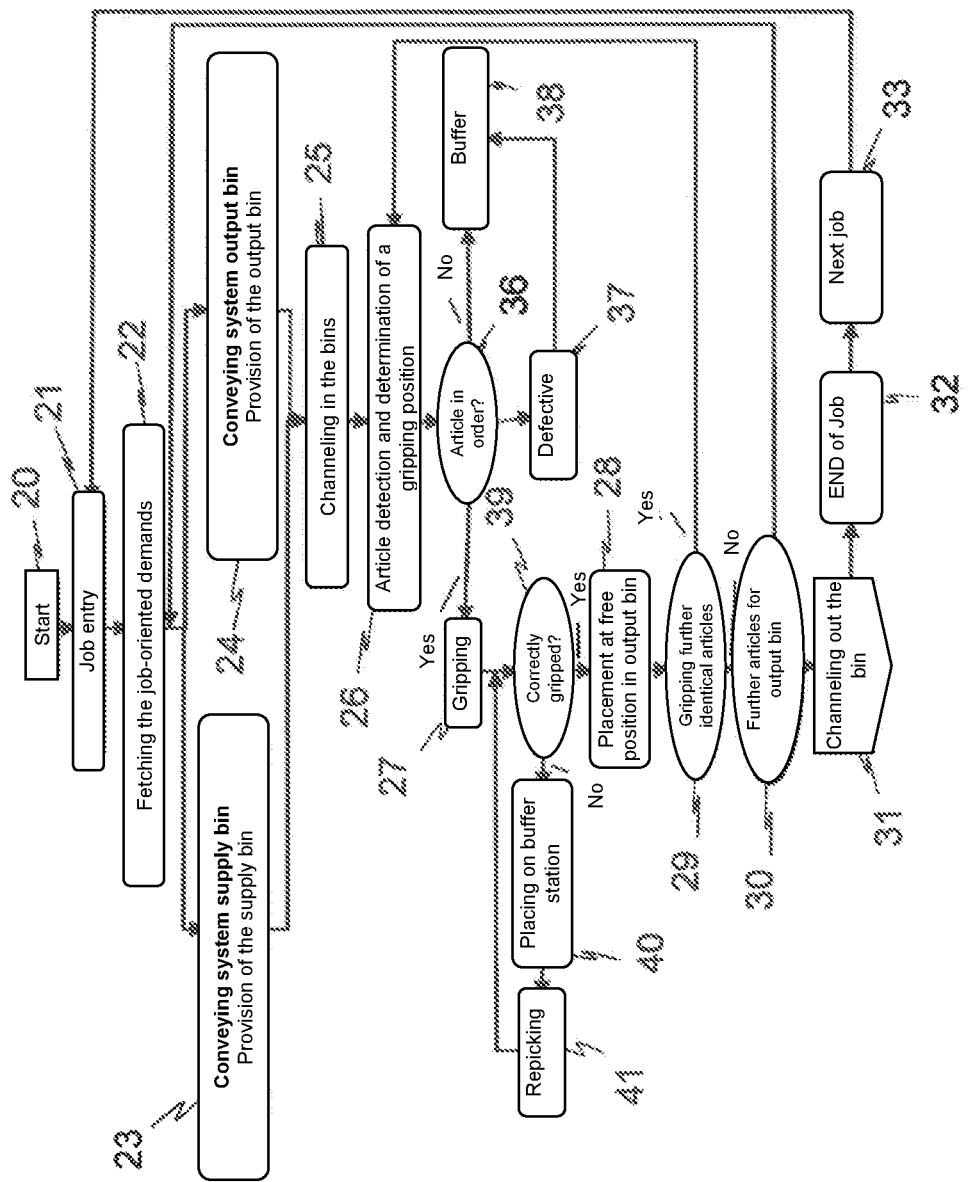
FIG. 5 shows a flowchart of a third embodiment of a method in accordance with the invention.

FIG. 5 shows a variant of the method shown in FIG. 3 in which a check is made after the object detection in step 26 whether the article to be gripped corresponds to the demands. If it is determined in step 37 that the article is damaged or that it is the incorrect article, it can be placed in a buffer in step 38. The object detection 26 is thereupon carried out again and the method is carried out with a further article.

If the article is in order, a gripping in turn takes place in step 27. A check can thereupon be made in step 39 whether the article has been correctly gripped. If this is not the case, the article is placed on the buffer station in step 40, whereupon a repicking takes place in step 41. If the check in step 39 has the result that the article has been correctly gripped, it is placed at a free position in the output bin as in the method in FIG. 3, step 28.

FIG. 6 shows a further variant of the method shown in FIG. 3 in which a gripper change is implemented. The gripper required for the gripping of a certain good is determined for this purpose in the additional step 42. This gripper is taken up from the gripper magazine in step 43.

The remaining steps of the variants shown in FIGS. 4 to 6 correspond to the method steps already shown with respect to FIG. 3.

The embodiments in accordance with the invention of a method can in particular be carried out using an embodiment of a picking cell in accordance with the invention. The carrying out takes place in an automated manner by the job management control and/or by the cell control.

The invention claimed is:

1. A picking cell for a job-related automated picking of goods, said picking cell comprising:
   the picking cell removes goods from supply bins and transfers the goods into an output bin to work through a job and/or a partial job in an automated manner;
   an object detection device for detecting the goods in a supply bin;
   a gripper for removing the goods from a supply bin; and
   a cell control for evaluating the data of the object detection device and for a path planning and a control of the gripper, and
   a second object detection device for detecting the goods in the output bin and the cell control evaluating data of the second object detection device to determine a position of a good to be placed based on a position of one or more of the goods already in the output bin.

2. A picking cell for a job-related automated picking of goods, said picking cell comprising:
   the picking cell removes the goods from supply bins and transfers the goods into an output bin to work through a job and/or a partial job in an automated manner;
   an object detection device for detecting the goods in a supply bin;
   a gripper for removing the goods from the supply bin; and
   a cell control for evaluating data of the object detection device and for a path planning and a control of the gripper, wherein the picking cell has a buffer station for the temporary placement of a good for a repeated gripping from the buffer station.

3. The picking cell in accordance with claim 2, wherein the picking cell comprises a further buffer station for buffering an output bin, wherein at least one of the following applies:
   the cell control and/or a job management control transfers an output bin into the buffer when the job or partial job associated with the output bin cannot be instantaneously connected and/or when a job or partial job having a higher priority is brought forward;
   the cell control and/or the job management control works through a new job or partial job in the picking cell by filling a further output bin after the transfer of a first output bin into the buffer and restarts the working through of a previous job after working through the new job or partial job;
   a separation bin transferred into the buffer; and wherein the cell control and/or the job management control checks the goods and separates out defective and/or incorrectly placed goods into the separation bin.

4. A picking cell for a job-related automated picking of goods, said picking cell comprising:
   the picking cell removes the goods from supply bins and transfers the goods into an output bin to work through a job and/or a partial job in an automated manner;
   an object detection device for detecting the goods in a supply bin and in the output bin;
   a gripper for removing the goods from the supply bin; and
   a cell control for evaluating data of the object detection device and for a path planning and a control of the gripper, wherein the cell control:
      controls the gripper such that the goods of a job or of a partial job are placed at a predefined position and/or with a predetermined orientation in the output bin,
      checks the data of the object detection device to determine if the goods have been properly placed in the predefined position and/or orientation in the output bin, and
      on a recognition of an improperly placed good, controls the gripper to perform at least one out of: correct the position and/or orientation of the improperly placed good in the output bin by contacting the improperly placed good with the gripper a second time, and adapt a position and/or orientation of at least one further good to be placed in the same output bin.

5. The picking cell in accordance with claim 4, wherein at least one out of the following limitations applies:
   the cell control controls the gripper such that different goods of a job or of a partial job are placed next to one another and/or on top of one another in the output bin;
   the cell control and/or a job management control determines the position and/or orientation of all the goods of a job or of a partial job that are to be picked together in an output bin before the start of and/or during the picking.

6. The picking cell in accordance with claim 4, wherein the object detection device comprises a first object detection device for detecting the goods in the supply bin and a second object detection device for detecting the goods in the output bin, and
   wherein contacting the improperly placed good with the gripper a second time comprises gripping the goods a second time.

7. The picking cell in accordance with claim 4, wherein the picking cell has at least one out of a robot arm at which the gripper is arranged; and at least one area gantry at which the gripper is arranged.

8. The picking cell in accordance with claim 4, wherein the picking cell has at least one out of:
   a first conveying system for supplying and/or discharging the supply bins to and/or from the picking cell;
   a second conveying system for supplying and/or discharging the output bins to and/or from the picking cell;

a plurality of supply bin positions in the form of bin receptacles for receiving supply bins;
one or more output bin positions in the form of bin receptacles for receiving output bins;
a transfer line that permits a transfer of a supply bin to an output bin position; wherein the cell control and/or a job management control is/are configured such that the supply bin is used as the output bin after the transfer.

9. The picking system having one or more picking cells in accordance with claim 4,
wherein the picking system has:
a first conveying system for supplying and/or discharging the supply bins to and/or from the picking cell or cells and a second conveying system for supplying and/or discharging the output bins from and/or to the picking cell or cells; and
a job management control for working through a plurality of picking jobs by controlling the first and second conveying systems and the picking cell or cells.

10. The picking cell in accordance with claim 4, further comprising the cell control checking the data of the object detection device to determine if the goods have been properly placed in the predefined position and/or orientation in the output bin after each subsequent placement of a good into the output bin, and
adapting a position of each subsequently placed good based on the position of previously placed goods.

11. The picking cell in accordance with claim 4, wherein the cell control and/or a job management control uses predetermined goods properties of the goods to be picked by a job and performs at least one out of:
determining the position and/or orientation of all the goods that are to be placed together in an output bin and/or the order in which the goods are to be placed in an output bin on the basis of the goods properties; and
splitting a job into a plurality of partial jobs in the framework of which a respective output bin is filled with the goods on the basis of the goods properties, and
wherein the determination and/or splitting takes place on the basis of one or more of: weight, size, shape, packaging properties, and kind of the goods.

12. The picking cell in accordance with claim 11, wherein the determination and/or splitting takes place on the basis of the weight and/or of the size and/or of the shape and/or of the packaging properties and/or the kind of the goods.

13. The picking cell in accordance with claim 4, comprising:
a cell control for evaluating the data of the object detection device and for a path planning and a control of the gripper, wherein the picking cell comprises a plurality of different grippers alternatively used for gripping the goods.

14. The picking cell in accordance with claim 13, comprising a gripper arm for moving at least one gripper, wherein a plurality of grippers is arranged and/or arrangeable at the gripper arm; wherein the picking cell has a gripper magazine having a plurality of different grippers; and wherein an automated replacement of the gripper arranged at the gripper arm takes place.

15. The picking cell in accordance with claim 13, wherein the cell control and/or a job management control uses predefined goods properties of the goods to be picked by a job and performs one of the following:
determining the position and/or orientation of all the goods of a job that are to be picked together in an output bin and/or the order in which the goods of a job placed in an output bin on the basis of the goods properties; and
splitting the job into a plurality of partial jobs within the framework of which a respective output bin is filled with goods;
the available grippers and/or the number of gripper changes required for working through a job and/or a partial job are taken into account in the determination of at least one out of the position of the goods, the orientation of the goods, the order of the goods and the splitting into partial jobs; and
the determination of the gripper or grippers takes place on the basis of at least one out of a weight, a size, a shape, packaging properties and a kind of the goods.

\* \* \* \* \*